(12) United States Patent
Kobayashi et al.

(10) Patent No.: US 6,452,780 B2
(45) Date of Patent: Sep. 17, 2002

(54) CAPACITOR

(75) Inventors: Shinichi Kobayashi, Izumo; Shuji Watanabe, Shimane-ken; Yoshitaka Kageyama, Izumo; Akira Nagai, Kyotanabe; Osamu Yamaoka, Izumo; Mitsuru Nagashima; Yuko Ihara, both of Shimane-ken, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/750,006

(22) Filed: Dec. 27, 2000

(30) Foreign Application Priority Data

Dec. 27, 1999 (JP) ............................................. 11-371403

(51) Int. Cl.[7] ......................... H01G 2/20; H01G 4/008; H01G 4/20; H01G 4/00
(52) U.S. Cl. ................................ 361/308.1; 361/306.3; 361/305; 361/320
(58) Field of Search .......................... 361/301.2, 301.3, 361/301.4, 303–305, 306.1–306.3, 308.1–308.3, 311–313, 320, 321.1–321.5

(56) References Cited

U.S. PATENT DOCUMENTS 5,258,886 A * 11/1993 Murayama et al. ...... 361/321.5

FOREIGN PATENT DOCUMENTS

JP             62-1214     * 1/1987 ............ H01G/4/12

* cited by examiner

*Primary Examiner*—Anthony Dinkins
*Assistant Examiner*—Eric W. Thomas
(74) *Attorney, Agent, or Firm*—Ostrolenk, Faber, Gerb & Soffen, LLP

(57) ABSTRACT

A capacitor including a ceramic body, a glass layer formed on each of opposite surfaces of the ceramic body, and a first metallic layer formed on the glass layer. Preferably, a lead terminal is connected to the first metallic layer or to a second metallic layer which is provided on the first metallic layer, by use of solder containing Pb in an amount of 2.5 wt. % or less. Preferably, a lead terminal which is plated with a substance containing Pb in an amount of 5 wt. % or less is soldered onto the first metallic layer or the second metallic layer.

18 Claims, 6 Drawing Sheets

TIME DURING WHICH THE CAPACITOR IS ALLOWED TO STAND

CAPACITOR

BACKGROUND OF THE INVENTION

1. Field of the Invention

The present invention relates to a capacitor; for example, a capacitor which is employed as a pulse generating capacitor (non-linear capacitor).

2. Background Art

Typical ordinal capacitors exhibit a linear characteristic. However, pulse-generating capacitors employed in an HID lamp, such as a high pressure sodium lamp or a metal halide lamp, have non-linear characteristics wherein the capacitance of the capacitor varies in a non-linear manner as a function of the applied voltage. These characteristics are achieved as a result of the materials, e.g., $BaTiO_3$ and $BaTi(Zr)O_3$, used for the ceramic body.

In typical pulse-generating capacitors, the electrodes are formed on the ceramic body using an electrode paste comprising Ag powder mixed with borosilicate glass or lead borosilicate glass, and varnish.

The glass is used because it enhances the bonding force between the electrode and the ceramic body. However, when electrodes are formed on a ceramic body by thermally applying such an electrode paste, the borosilicate glass or lead borosilicate glass diffuses into the ceramic body thereby degrading the pulse characteristics which are inherent to the ceramic substrate. Furthermore, the thickness or state of the resultant glass layer varies as a function of the method of printing or thermal conditions used to apply the electrode paste which induces variations in the nonlinear characteristics of the resultant capacitor.

Pulse-generating capacitors usually have lead terminals which are soldered onto the electrodes. Since they are used in the base of an HID lamp, the capacitors are usually subjected to high temperatures. However, when pulse-generating capacitors having lead terminals are used at high temperatures, the electric characteristics of the capacitors deteriorate. This is because Sn contained in the solder used to electrically connect the lead terminal to the electrode diffuses into the electrode, and the diffused Sn weakens the bonding between the glass and metal in the electrode or the bonding between the glass and the ceramic substrate. Therefore, an improved pulse-generating capacitor suitable for use at high temperature has been demanded.

SUMMARY OF THE INVENTION

In view of the foregoing, an object of the present invention is to provide a capacitor which exhibits consistent electric characteristics. Another object of the present invention is to provide a capacitor which comprises lead terminals soldered onto electrodes and which maintains its electric characteristics at high temperature.

In order to attain the aforementioned objects, the present invention provides a capacitor comprising a ceramic body, a glass layer formed on each of opposite surfaces of a ceramic body, and first metallic layer formed on the glass layer.

By virtue of the aforementioned structure, variations in the electric characteristics of the capacitor can be reduced, since the ceramic body is separated from the first metallic layers by the glass layers. When the ceramic exhibits a non-linear characteristic, the material of the glass layer is preferably lead bismuth borosilicate glass or barium borosilicate glass. This is because such glass does not readily diffuse into the ceramic body when electrodes are formed on the ceramic body through thermal application of the electrode, and thus pulse characteristics inherent to the ceramic body can be developed.

The glass layers are formed at high productivity by thermally treating an admixture of the ceramic body and glass powder while stirring the admixture, or by applying a paste containing metallic powder and glass powder onto the ceramic body and then firing the resultant body. Particularly, when the admixture of the ceramic body and glass powder is thermally treated while the admixture is stirred, the glass layers are formed to a uniform thickness on the surface of the ceramic body. As a result, variations in the electric characteristics of the capacitor are further reduced, and the withstand voltage of the capacitor is enhanced.

When the first metallic layers are formed of a barrier element 'M' where M—O bond energy is stronger than Sn—O bond energy, they act as a barrier layer preventing Sn from migrating to the glass layer. Particularly, even if the capacitor is used at high temperatures and the Sn contained in the solder diffuses into the electrodes, the first metallic layers prevent diffusion of Sn and migration of Sn into the glass layers. Therefore, the electric characteristics of the capacitor do not deteriorate. Examples of the aforementioned barrier material include Ti, Mo, W, V, Cr, Ni, and alloys thereof.

Preferably, lead terminals are connected to the first metallic layers, or to second metallic layers which are provided on the first metallic layers, by use of solder containing Pb in an amount of 2.5 wt. % or less. Preferably, lead terminals which are plated with a substance containing Pb in an amount of 5 wt. % or less are soldered onto the first metallic layers or the second metallic layers.

As described above, since the amount of Pb contained in the solder or the amount of Pb contained in the substance which is employed for plating the lead terminals is low, the amount of Pb which diffuses within the electrode decreases, and Pb does not readily invade into the glass layers. Consequently, the electric characteristics of the capacitor tend not to deteriorate.

BRIEF DESCRIPTION OF THE DRAWINGS

Other features and advantages of the present invention will become apparent from the following description of the invention which refers to the accompanying drawings.

DETAILED DESCRIPTION OF PREFERRED EMBODIMENTS

Embodiments of the capacitor of the present invention will next be described with reference to the accompanying drawings. According to the present invention, a preferred embodiment of the metallic layer is an electrode layer, and therefore, hereinafter the description will be given of the structure of the capacitor containing electrode layers and the production process therefor.

(Structure of capacitor (FIGS. 1 through 3))

Taking as an example a pulse-generating capacitor (non-linear capacitor) employed as a starter of an HID lamp, the basic structure as well as a process for producing the capacitors is described.

Figure 1:
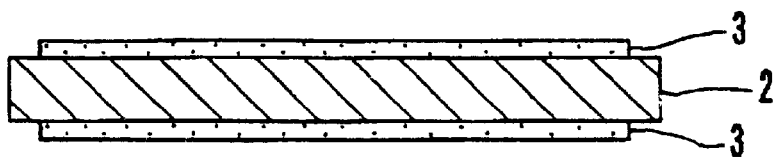
FIG. 1 is a cross-sectional view showing a procedure for producing the capacitor of the present invention.

A ceramic body 2 as shown in FIG. 1 is formed as follows. A ceramic powder, predominantly containing barium titanate zirconate or strontium titanate, is kneaded with a binder, to prepare a slurry. The slurry is placed into a mold, dry-pressed and then fired to form a ceramic body. Subsequently, a glass paste containing lead bismuth borosilicate glass or barium borosilicate glass is applied onto opposite surfaces of the ceramic body 2, preferably by a printing process, so as to attain a thickness of 0.01–0.1 μm. Thereafter, the resultant body is baked at 850° C. to form glass layers 3.

Figure 2:
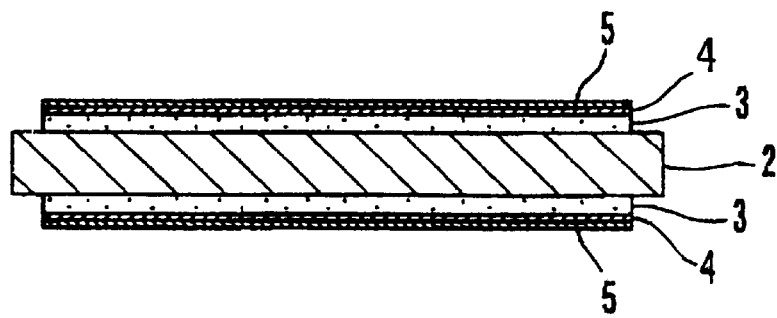
FIG. 2 is a cross-sectional view showing a procedure for producing the capacitor of the present invention, the procedure being subsequent to that shown in FIG. 1.

Subsequently, as shown in FIG. 2, first electrode layers 4 are formed on the glass layers 3 through sputtering, vacuum deposition, or printing. The material of the first electrode layers 4 is preferably a metal which exhibits a bonding force to oxygen (bond energy) which is stronger than the bonding force of Sn to oxygen and which exhibits Sn-barrier effects. Specific examples of such metals include Ti, Mo, V, Cr, Ni, and alloys thereof. When formation of the first electrode layers 4 has been completed, second electrode layers 5 are formed on the layers 4 through sputtering, vacuum deposition, or printing. The material of the second electrode layers 5 is preferably a metal on which soldering is easily carried out. Specific examples of such materials include Au, Ag, Cu, Ni, and alloys thereof.

Figure 3:
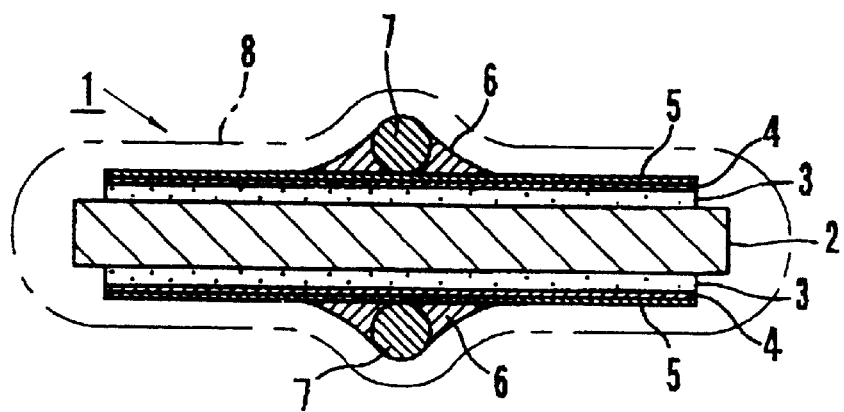
FIG. 3 is a cross-sectional view showing an embodiment of the capacitor of the present invention.

Subsequently, as shown in FIG. 3, lead terminals 7 are soldered onto the second electrode layers 5 through reflow soldering. Solder 6 is preferably formed of a substance containing no more than a small amount of Pb, such as Sn, Sn/Ag, or Sn/Cu. Also, the lead terminals 7 are preferably plated with such a substance. After completion of soldering of the lead terminals 7, an epoxy powder resin is applied, through fluidized-bed coating, onto the surface of a capacitor 1 excluding that portion of the terminals 7 which is employed for electrical connection, to thereby form a coating 8.

In the non-linear capacitor 1 having the aforementioned structure, variations in electric characteristics can be reduced since the ceramic body 2 is separated from the first electrode layers 4 by the glass layers 3. In addition, since the glass layers 3 are formed of lead bismuth borosilicate glass or barium borosilicate glass, even when the electrode layers 4 and 5 are formed on the layers 3 through baking, the glass does not diffuse into the ceramic body 2, and thus the pulse characteristics inherent to the ceramic body 2 can be developed.

Furthermore, since the first electrode layers 4 are formed of a metal which exhibits a bonding force to oxygen (bond energy) which is stronger than the bonding force of Sn to oxygen, even when the capacitor 1 is used at high temperature and Sn contained in the solder 6 diffuses through the electrode layers 5 to the layers 4, the first electrode layers 4 prevent further diffusion of Sn into the glass layers 3. Consequently, the electric characteristics of the capacitor 1 do not deteriorate. In addition, since the solder 6 is formed of a substance containing no more than a small amount of Pb (such as Sn, Sn/Ag, or Sn/Cu), and the lead terminals 7 are plated with such a substance, even when the capacitor 1 is used at a high temperature, the amount of Pb which diffuses into the electrode layers 5 and 4 decreases, and Pb does not readily invade into the glass layers 3. Consequently, the electric characteristics of the capacitor 1 do not deteriorate.

(Glass layer (FIGS. 4 through 9))

The formation of the glass layers 3 will next be described in more detail. Three typical, but non-limiting, processes for forming the glass layers 3 are described below. In a first formation process, as described above, a glass paste containing lead bismuth borosilicate glass or barium borosilicate glass is applied onto opposite surfaces of the ceramic body 2 by a printing process so as to attain a thickness of 0.01–0.1 μm and the resultant body is baked at 850° C. to thereby form the glass layers 3.

Figure 4:
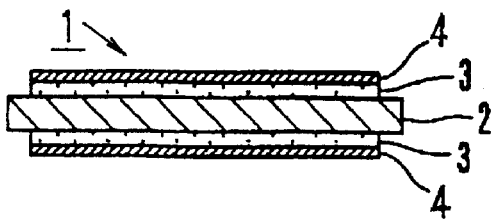
FIG. 4 is a cross-sectional view of the capacitor of the present invention to illustrate the first formation process for glass layers.

For example, as shown in FIG. 4, a ceramic disk 2 (diameter: 18 mm, thickness: 1 mm) was formed from ceramic powder predominantly containing barium titanate zirconate. Subsequently, a glass paste containing barium borosilicate glass was applied onto opposite surfaces of the ceramic disk 2 by a printing process to form glass layers 3 having a circular pattern (diameter: 16 mm). Thereafter, first electrode layers 4 were formed on the glass layers 3 from Cu, Ni, Ag, or Ag—Pd through sputtering, vacuum deposition, or printing. In the present embodiment, a Cu layer having a thickness of 0.3 μm was formed through sputtering.

Figure 5:
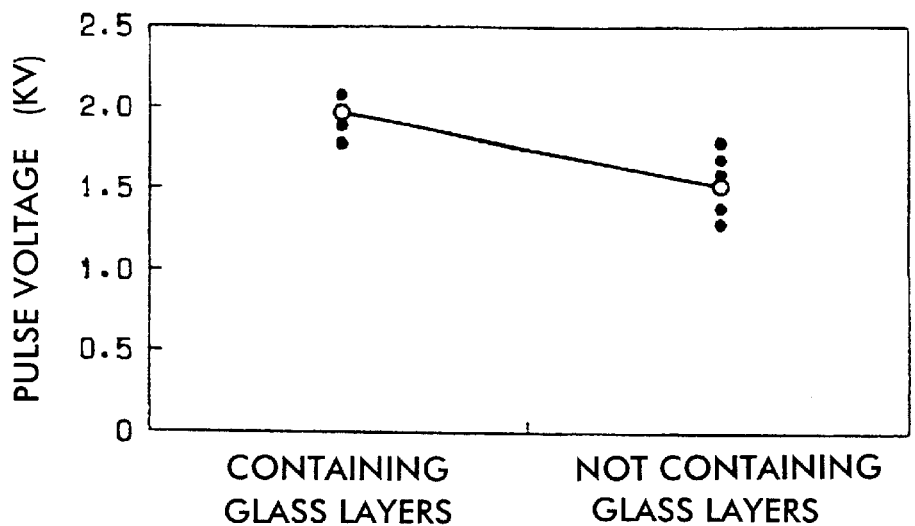
FIG. 5 is a graph showing the results of measurement of pulse voltage generated from the capacitor shown in FIG. 4.
Figure 6:
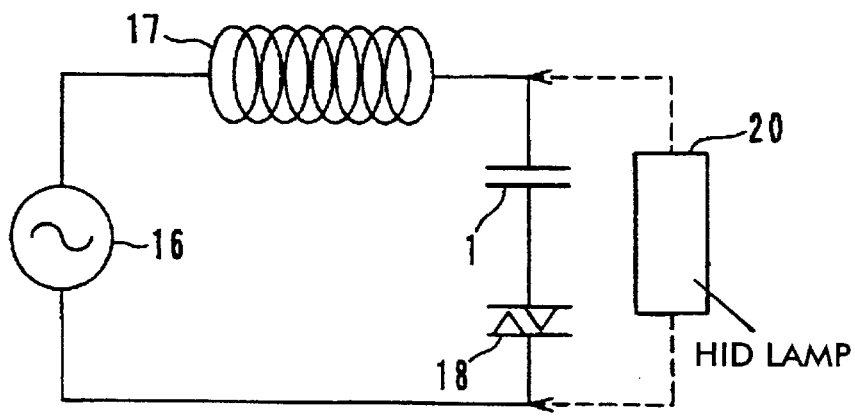
FIG. 6 is a diagram of an electric circuit for measuring pulse voltage generated from the capacitor of the present invention.

FIG. 5 is a graph showing, on the left, the results of measurement of the pulse voltage generated from the so produced non-linear capacitors 1. For comparison, the graph also shows, on the right, the results of measurement of the pulse voltage generated from capacitors which do not have the glass layers 3. The two test results shown with an open circle, and connected by a solid line, indicate two directly comparative test capacitors. As is apparent from FIG. 5, the pulse voltages generated from the capacitors 1 including the glass layers 3 are consistent and at a high level. In contrast, the pulse voltages generated from the capacitors in which the glass layers 3 were omitted vary considerably and are at a low level.

The pulse voltage generated from the capacitor was measured using a circuit (FIG. 6) comprising an alternating-current power supply 16, a ballast 17 for a high pressure mercury lamp of 400 W, and a thyristor switch 18 having a breakover voltage of 150 V. When an alternating voltage is applied to the non-linear capacitor 1 from the alternating-current power supply 16, polarization rapidly inverts because of capacitor hysteresis and current flows during the inversion. When the voltage applied to the capacitor increases, the polarization reaches saturation, and the current passing through the capacitor decreases to a very low level. As the current varies, a pulse voltage (counter electromotive force) is generated between both ends of the ballast (coil) 17 since the ballast (coil) 17 is connected to the non-linear capacitor in series. When an HID lamp 20, such as a high-pressure sodium lamp or a metal halide lamp, is used, the lamp is connected to the circuit at the position represented by the dashed line and arrows.

Figure 7:
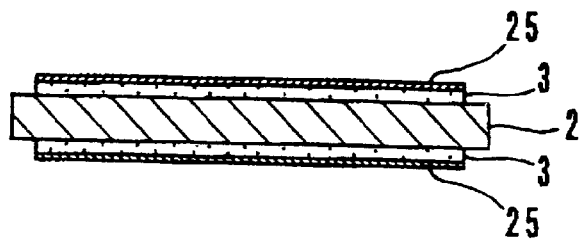
FIG. 7 is a cross-sectional view of the capacitor of the present invention to illustrate the second formation process for glass layers.

In a second formation process of the glass layers 3, a paste containing metallic powder and glass powder is applied onto opposite surfaces of the ceramic body 2 using a printing process, so as to attain a thickness of, for example, 5 $\mu$m, and then the resultant body is baked at a high temperature, to form the glass layers 3. In the process, as shown in FIG. 7, glass powder precipitates in each of the resultant films on the side which is brought into contact with the ceramic body to form the glass layers 3. In contrast, metallic powder precipitates in each of the films on the opposite side (the outer surface of the film) to thereby form sintered electrode layers 25. The thickness of each of the glass layers 3 is preferably adjusted to be between 0.01–0.1 $\mu$m. Examples of the metallic powder include Au powder, Ag powder, Cu powder, and Ni powder.

Figure 8:
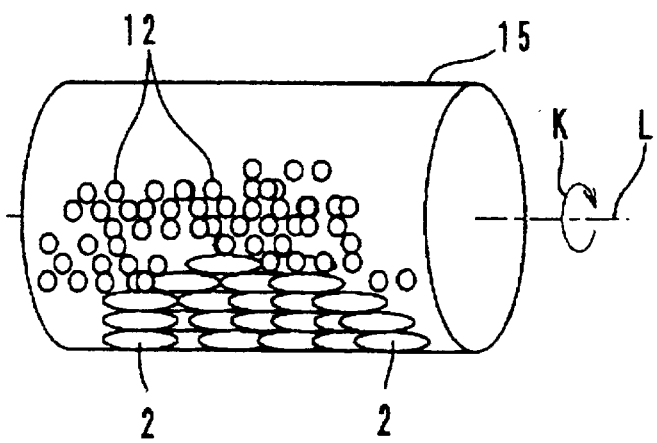
FIG. 8 is a schematic representation of an apparatus which is employed for carrying out the third formation process for glass layers.
Figure 9:
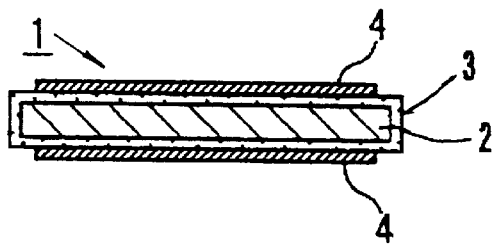
FIG. 9 is a cross-sectional view of the capacitor of the present invention to illustrate the third formation process for glass layers.

In a third formation process of the glass layers 3, as shown in FIG. 8, the ceramic bodies 2 and barium borosilicate glass powder 12 are placed in a cylindrical alumina pot 15, and then the pot 15 is rotated about an axis L in the direction represented by the arrow K in a furnace (not shown) at 850° C. As a result, the ceramic body 2 (FIG. 9) and the barium borosilicate glass powder 12 are mixed together in the pot 15, the glass powder 12 is uniformly affixed to the ceramic body and then baked, and the glass layer 3 having a uniform thickness is formed on the entire surface of the ceramic body 2. The thickness of each of the glass layers 3 is preferably set to 0.01–0.1 $\mu$m.

Figure 10:
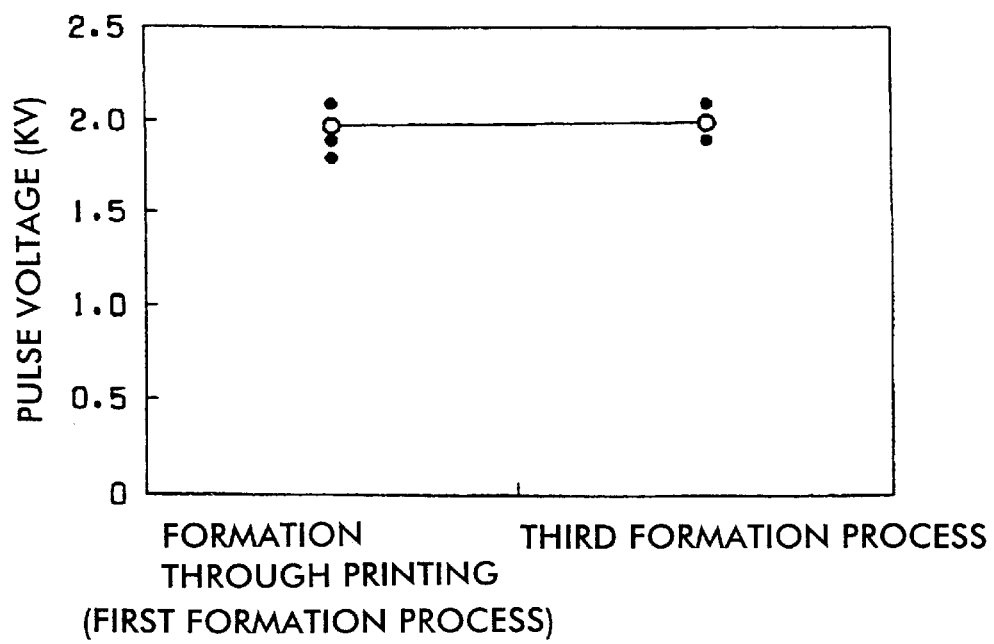
FIG. 10 is a graph showing the results of measurement of pulse voltage generated from the capacitor shown in FIG. 9.

After the glass layers 3 have been formed, Cu layers 4 (first electrode layers) having a thickness of 0.3 $\mu$m were formed on the glass layer 3 through sputtering. In the capacitor 1 comprising the glass layer 3 formed through the third process, the variance in electric characteristics is further reduced as compared with the capacitor comprising the glass layers formed through printing, since the glass layer 3 is uniformly formed on the ceramic body 2. FIG. 10 is a graph showing the results of measurement of the pulse voltage generated from the capacitors 1 including the glass layer 3 formed through the third formation process. For comparison, the graph also shows the results of measurement of the pulse voltage generated from capacitors including the glass layers 3 formed through printing.

(First electrode layer (FIGS. 11 through 15))

Figure 11:
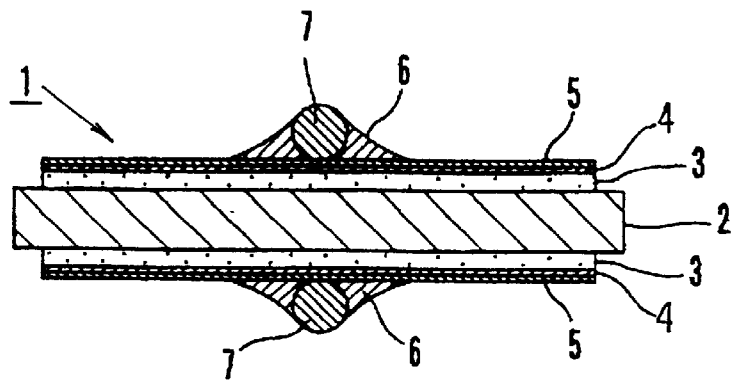
FIG. 11 is a cross-sectional view of the capacitor of the present invention to illustrate an embodiment of the first electrode layers.

The formation of the first electrode layers 4 will next be described in more detail. As described above, the first electrode layers 4 are preferably formed of a metal which exhibits a bonding force to oxygen (bond energy) stronger than the bonding force of Sn to oxygen and which exhibits Sn-barrier effects. Examples of such metals include Ti, Mo, V, Cr, Ni, and alloys thereof. By way of example, as shown in FIG. 11, a ceramic disk 2 (diameter: 12 mm, thickness: 1 mm) was formed from ceramic powder predominantly containing barium titanate zirconate. Subsequently, a glass paste containing barium borosilicate glass was applied onto opposite surfaces of the ceramic disk 2 by printing, to thereby form glass layers 3 (diameter: 11 mm, thickness: 0.01 $\mu$m) having a circular pattern.

Subsequently, first electrode layers 4 made of monel (Ni—Cu alloy) and having a thickness of 0.5 $\mu$m were formed on the glass layers 3 through sputtering, and then second electrode layers 5 made of Cu and having a thickness of 0.3 $\mu$m were formed on the first electrode layers 4. Thereafter, solder-plated soft copper wires 7 serving as lead terminals were soldered to the second electrode layers 5 through reflow soldering using a cream solder 6 containing Sn and Ag (Sn/Ag=96.5/3.5).

Figure 12:
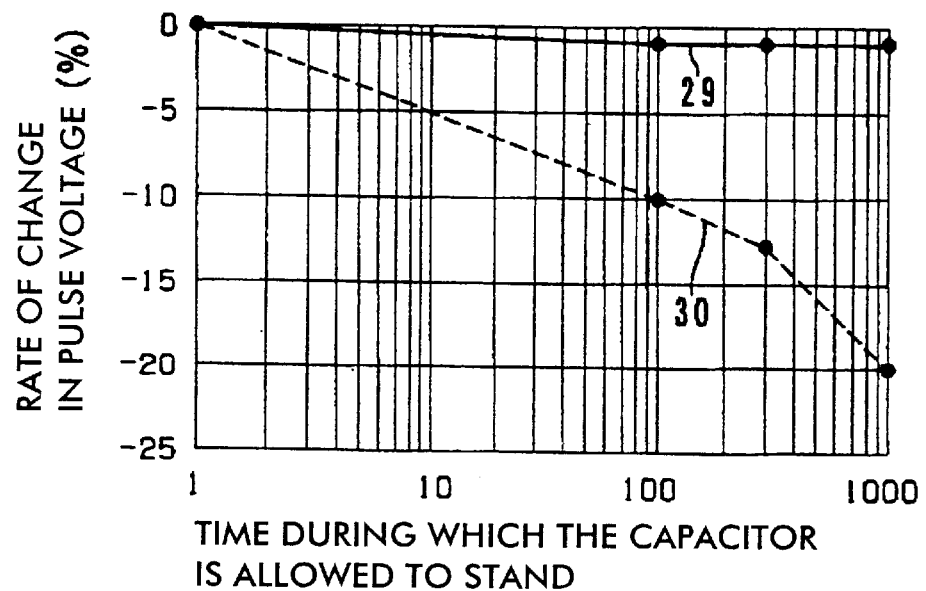
FIG. 12 is a graph showing the relation between the time during which the capacitor shown in FIG. 11 is allowed to stand at high temperature and the rate of change in pulse voltage generated from the capacitor.

When the resultant non-linear capacitor 1 including the lead terminals 7 is used at high temperature and Sn contained in the solder 6 diffuses into the electrodes, the first electrode layers 4 prevent diffusion of Sn into the electrodes, and thus Sn cannot readily invade into the glass layers 3. Consequently, reduction in the pulse voltage generated from the non-linear capacitor 1 can be prevented. The rates of change in pulse voltage generated from the capacitor 1 were measured at one hour, 100 hours, 300 hours, and 1,000 hours after the capacitor 1 was allowed to stand at 150° C. FIG. 12 is a graph showing the results of these measurements by way of solid line 29. For comparison, a capacitor comprising the ceramic disk, the glass layers formed on the opposite surfaces of the ceramic disk, and Ag electrodes formed on the glass layers was produced; and the rates of change in the pulse voltage generated from the capacitor were measured. The results are also shown in FIG. 12 as dotted line 30. As is apparent from FIG. 12, pulse voltage generated from the capacitor 1 including the first electrode layers 4 exhibiting Sn-barrier effects is consistent and at a high level even when the capacitor 1 is allowed to stand at a temperature as high as 150° C. In contrast, the pulse voltage generated from the capacitor not including electrode layers exhibiting Sn-barrier effects drops considerably when the capacitor is allowed to stand at a temperature as high as 150° C.

In addition, these capacitors were analyzed by an X-ray micro-analyzer after they had been allowed to stand for 1,000 hours at 150° C. In the capacitor not including metallic layers exhibiting Sn-barrier effects, Sn diffused almost uniformly throughout the entirety of the glass layers, but in the capacitor 1 including the first electrode layers 4 exhibiting Sn-barrier effects, Sn did not diffuse into the glass layers 3 to any significant extent.

Figure 13:
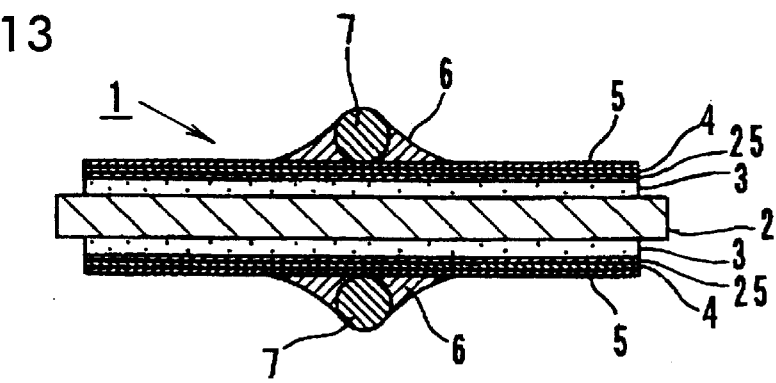
FIG. 13 is a cross-sectional view of the capacitor of the present invention to illustrate another embodiment of the first electrode layers.

As shown in FIG. 13, a ceramic disk 2 (diameter: 13 mm, thickness: 0.5 mm) was formed from ceramic powder predominantly containing strontium titanate. Separately, Ag powder and glass powder were kneaded with a binder (varnish) to prepare a paste. The resultant paste was applied onto opposite surfaces of the ceramic disk 2 by printing to form thick films, and then the resultant disk was baked at 850° C., to form glass layers 3. As a result of this structure, glass powder was precipitated in each of the resultant films on the side brought into contact with the ceramic disk to form the glass layers 3. In contrast, Ag powder was precipitated in each of the films on the opposite side (the outer surface of the film) to form sintered electrode layers (third electrode layers) 25. On the Ag sintered electrode layers 25, Ti layers having a thickness of 0.2 $\mu$m; i.e., first electrode layers 4, and Cu layers having a thickness of 0.3 $\mu$m i.e., second electrode layers 5, were successively formed through sputtering. Subsequently, solder-plated soft copper wires 7 serving as lead terminals were connected to the second electrode layers 5 through reflow soldering using a cream solder 6 containing Sn and Ag (Sn/Ag=96.5/3.5).

Figure 14:
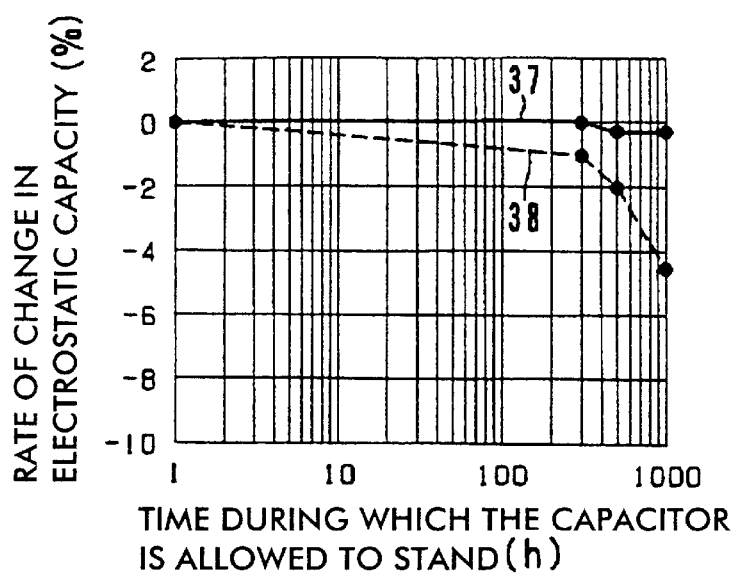
FIG. 14 is a graph showing the relation between the time during which the capacitor shown in FIG. 13 is allowed to stand at high temperature and the rate of change in electrostatic capacity of the capacitor.
Figure 15:
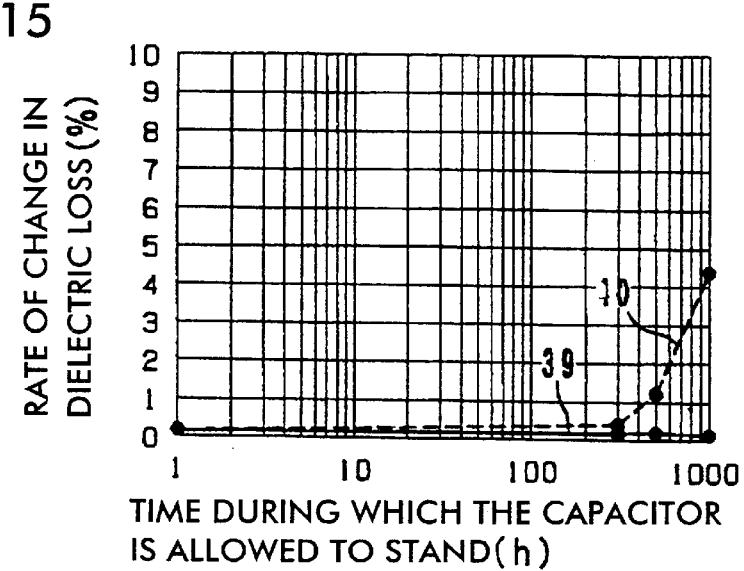
FIG. 15 is a graph showing the relation between the time during which the capacitor shown in FIG. 13 is allowed to stand at high temperature and the rate of change in dielectric loss of the capacitor.

Even when the ceramic capacitor 1 comprising the lead terminals 7 which is produced through the aforementioned procedure is used at high temperature and Sn contained in the solder 6 diffuses into the electrodes, the first electrode layers 4 prevent further diffusion of Sn and invasion of Sn into the glass layers 3. Consequently, reduction in the electrostatic capacity of the capacitor 1 or increases in dielectric loss thereof can be prevented. The rates of change in electrostatic capacity and in dielectric loss of the capacitor 1 were measured at one hour, 300 hours, 500 hours, and 1,000 hours after the capacitor 1 was allowed to stand at 150° C. FIGS. 14 and 15 are graphs showing the results of the tests (see solid lines 37 and 39). The electrostatic capacity and dielectric loss of the capacitor 1 were measured at 1 KHz and 1 Vrms. For comparison, a capacitor not including the first electrode layers 4 and the second electrode layers 5 was produced; and the rates of change in electrostatic capacity and in dielectric loss of the capacitor were measured. The results are also shown in FIGS. 14 and 15 (see dotted lines 38 and 40). As is apparent from FIGS. 14 and 15, the electrostatic capacity and dielectric loss of the capacitor 1 including the first electrodes 4 exhibiting Sn-barrier effects do not change even when the capacitor is allowed to stand at a temperature as high as 150° C. In contrast, the electrostatic capacity of the capacitor not including the metallic layers exhibiting Sn-barrier effects decreases and the dielectric loss of the capacitor increases with the passage of time when the capacitor is allowed to stand at a temperature as high as 150° C.

(Solder and plating of lead terminals (FIGS. 16 through 18))

The process for applying solder 6 and plating lead terminals 7 will next be described in more detail. As described above, the solder 6 is preferably formed of a substance containing a small amount of Pb (or not containing Pb), such as Sn, Sn/Ag, or Sn/Cu. Also, the lead terminals 7 are preferably plated with such a substance. More specifically, the solder 6 is formed of a substance containing Pb in an amount of 2.5 wt. % or less, and the lead terminals 7 are plated with a substance containing Pb in an amount of 5 wt. % or less.

Figure 16:
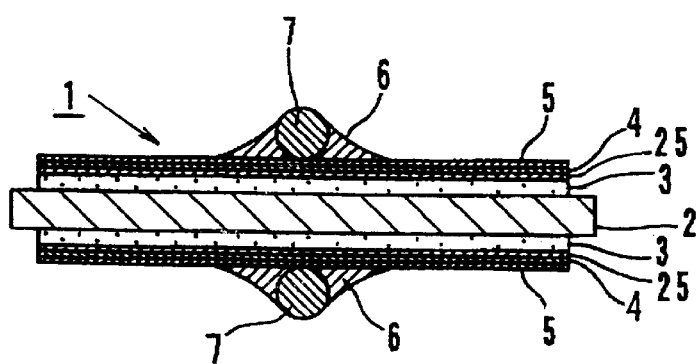
FIG. 16 is a cross-sectional view of one of capacitors to illustrate an embodiment of solder or a substance which is employed for plating of lead terminals.

As shown in FIG. 16, a ceramic disk 2 (diameter: 12 mm, thickness: 1 mm) was formed from ceramic powder predominantly containing barium titanate zirconate. Separately, Ag powder and glass powder were kneaded with a binder (varnish), to thereby prepare a paste. The resultant paste was applied onto opposite surfaces of the ceramic disk 2 by printing so as to attain a thickness of 5 $\mu$m, and then the resultant disk was baked at 850° C., to form glass layers 3. As a result, glass powder was precipitated in each of the resultant films on the side brought into contact with the ceramic disk, to thereby form the glass layers 3. In contrast, Ag powder was precipitated in each of the films on the opposite side (the outer surface of the film) to form sintered third electrode layers 25. On the Ag sintered electrode layers 25, first electrode layers (Sn-barrier layers) formed of monel (Ni—Cu) having a thickness of 0.5 $\mu$m and second electrode layers 5 formed of Cu layers having a thickness of 0.3 $\mu$m were successively formed through sputtering.

Subsequently, Sn-plated soft copper wires 7 serving as lead terminals were connected to the second electrode layers 5 through reflow soldering using a cream solder 6. In this case, six types of the solder 6 (i.e., Sn/Ag=96.5/3.5; Sn/Pb/Ag=95.8/0.7/3.5, 94/2.5/3.5, 91.5/5/3.5, 86.5/10/3.5; and Sn/Pb=60/40) were employed, to thereby produce six different capacitors 1.

Figure 17:
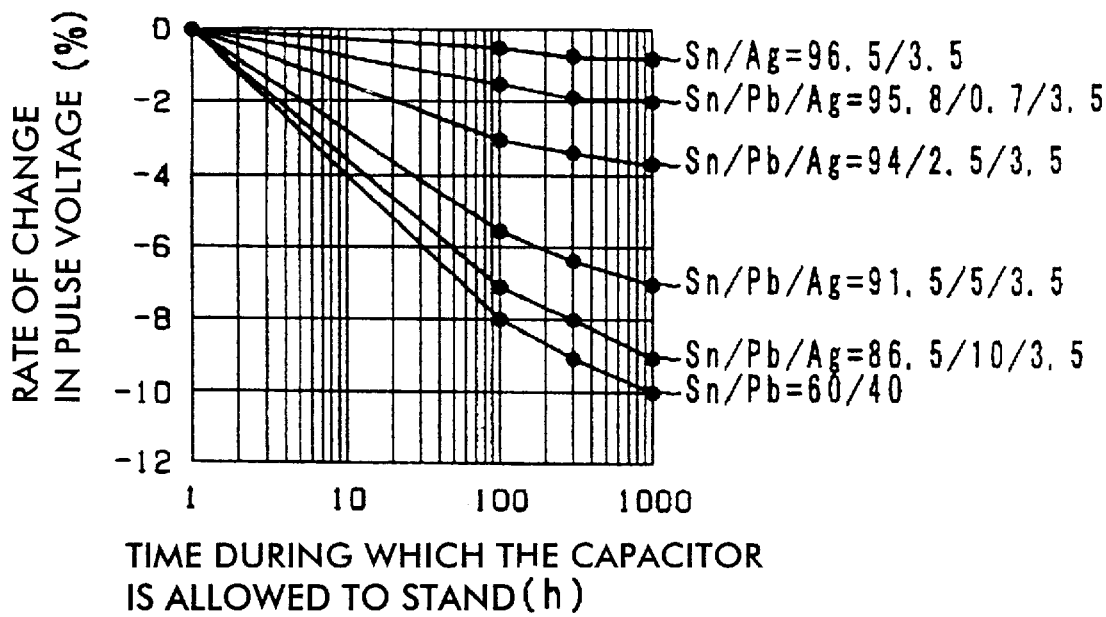
FIG. 17 is a graph showing the relation between the time during which the capacitor shown in FIG. 16 is allowed to stand at high temperature and the rate of change in pulse voltage generated from the capacitor, the respective capacitors being produced by use of various types of solder.

The rates of change in the pulse voltage generated from the respective capacitors 1 were measured after one hour, 100 hours, 300 hours, and 1,000 hours after the capacitors 1 were allowed to stand at 150° C. FIG. 17 is a graph showing the results of these tests. As is apparent from FIG. 17, in the case in which the amount of Pb contained in the solder 6 is as small as 2.5 wt. % or less, even when the capacitor 1 is allowed to stand at high temperature and Pb contained in the solder 6 diffuses into the electrodes, the amount of the diffused Pb is suppressed and Pb cannot readily invade into the glass layers 3. Briefly, when the amount of Pb contained in the solder 6 is 2.5 wt. % or less, the rate of change in pulse voltage can be suppressed to the degree (−4% or less) that problems during practical use do not arise.

Figure 18:
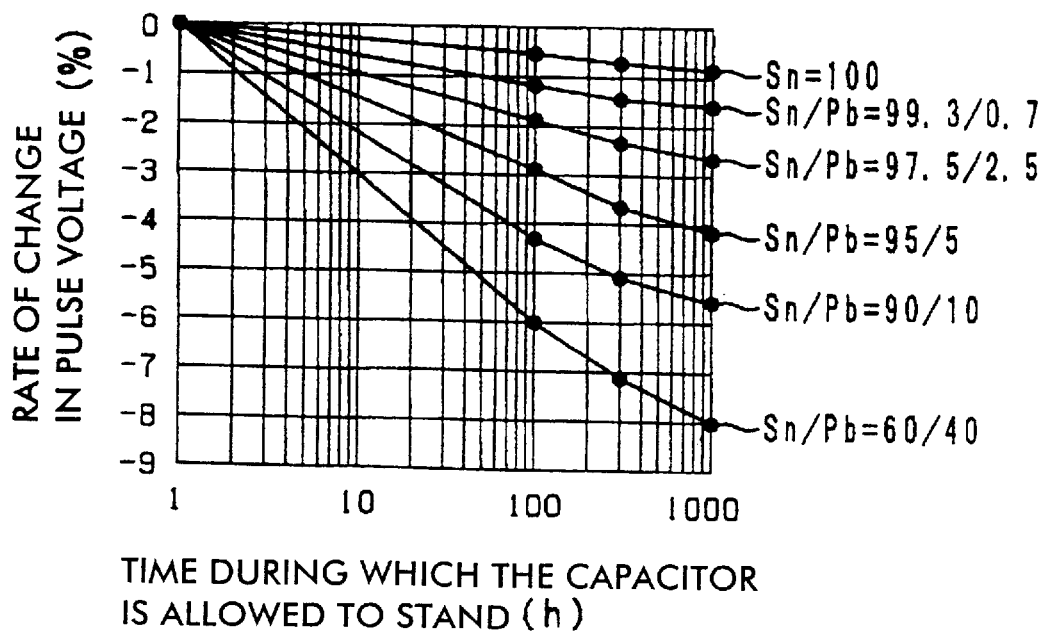
FIG. 18 is a graph showing the relation between the time during which the capacitor shown in FIG. 16 is allowed to stand at high temperature and the rate of change in pulse voltage generated from the capacitor, a variety of substances being employed for plating of the lead terminals of the respective capacitors.

Separately, six types of the soft copper wire lead terminals 7 plated with six substances (i.e., Sn=100; and Sn/Pb=99.3/0.7, 97.5/2.5, 95/5, 90/10, and 60/40) were connected to the second electrode layers 5 through reflow soldering using a cream solder 6 formed of Sn/Ag=96.5/3.5, to produce six different capacitors 1. The rates of change in the pulse voltage generated from the respective capacitors 1 were measured after one hour, 100 hours, 300 hours, and 1,000 hours after the capacitors 1 were allowed to stand at 150° C. FIG. 18 is a graph showing the results of these tests.

As is apparent from FIG. 18, in the case in which the amount of Pb contained in the substance for plating of the lead terminals 7 is as small as 5 wt. % or less, even when the capacitor 1 is allowed to stand at high temperature and Pb contained in the substance diffuses into the electrodes, the amount of the diffused Pb is suppressed and Pb cannot readily invade the glass layers 3. Briefly, when the amount of Pb contained in the substance is 5 wt. % or less, the rate of change in pulse voltage can be suppressed to the degree (−4% or less) that problems during practical use do not arise.

As is apparent from the above description, variations in the electric characteristic of the capacitor of the present invention can be reduced since the ceramic body is separated from the first metallic layers by the glass layers. In the case in which the ceramic body is used for producing a non-linear capacitor, when lead bismuth borosilicate glass or barium borosilicate glass is employed as a material for the glass layers, pulse characteristics inherent to the ceramic body can be developed, since such glass cannot readily diffuse into the ceramic body when electrodes are formed on the ceramic body through baking.

The glass layers can be formed with a high productivity by thermally treating an admixture of the ceramic body and glass powder while stirring the admixture, or by applying a paste containing metallic powder and glass powder onto the ceramic body and then baking the paste. Particularly, when the admixture of the ceramic body and glass powder is thermally treated while the admixture is stirred, the glass layers are formed at a uniform thickness on the surface of the ceramic body. As a result, variations in the electric characteristic of the capacitor is further reduced, and the withstand voltage of the capacitor is enhanced.

When the first metallic layers are formed of a material which. exhibits a bonding force to oxygen (bond energy) which is stronger than the bonding force of Sn to oxygen, even if the capacitor is employed at high temperature and Sn contained in the solder which is then applied onto the electrodes formed of the first metallic layers diffuses into the electrodes, the first metallic layers prevent diffusion of Sn and the invasion of Sn into the glass layers. Therefore, the electric characteristics of the capacitor do not deteriorate.

In addition, when the amount of Pb contained in the solder for soldering is 2.5 wt. % or less, or when the amount of Pb contained in the substance which is employed for plating the lead terminals is 5 wt. % or less, the amount of Pb which diffuses into the electrodes decreases, and Pb cannot readily invade into the glass layers. Consequently, the electric characteristics of the capacitor tend not to deteriorate.

The capacitor of the present invention is not limited to the above-described embodiments, and may be variously changed within the spirit of the present invention.

The present invention may be embodied in other specific forms without departing from the spirit or essential attributes thereof and, accordingly, reference should be made to the appended claims, rather than to the foregoing specification, as indicating the scope of the invention.

What is claimed is:

1. A capacitor comprising a ceramic body, respective glass layers formed on opposite surfaces of the ceramic body, and respective first metallic layers formed on the glass layers; wherein a respective second metallic layer is further formed on each said first metallic layer.

2. A capacitor according to claim 1, wherein the ceramic body is of a type which will produce a non-linear capacitor, and the material of the glass layers is lead bismuth borosilicate glass or barium borosilicate glass.

3. A capacitor according to claim 1, wherein the ceramic body is of a type which will produce a non-linear capacitor, and the glass layers are formed by thermally treating a mixture of the ceramic body and glass powder while stirring the mixture.

4. A capacitor according to claim 1, wherein the ceramic body is of a type which will produce a non-linear capacitor, and the glass layers are formed by applying a paste containing metallic powder and glass powder onto the ceramic body and then baking the resultant body.

5. A capacitor according to claim 1, wherein each said first metallic layer is formed of a material which exhibits a bonding force to oxygen which is stronger than the bonding force of Sn to oxygen.

6. A capacitor according to claim 5, wherein the material which exhibits a bonding force to oxygen stronger than the bonding force of Sn to oxygen is selected from the group consisting of Ti, Mo, W, V, Cr, Ni, and an alloy thereof.

7. A capacitor according to claim 6, wherein the ceramic body is of a type which will produce a non-linear capacitor.

8. A capacitor according to any one of claims 1–7, wherein at least one of the first and second metallic layers is formed through vacuum deposition or sputtering.

9. A capacitor comprising a ceramic body, respective glass layers formed on opposite surfaces of the ceramic body, and respective first metallic layers formed on the glass layers; wherein the glass layers and the first metallic layers are formed by applying a paste containing metallic powder and glass powder onto the ceramic body and then baking the resultant body, and a respective second metallic layer is further formed on each said first metallic layer.

10. A capacitor according to claim 9, wherein each said second metallic layer is formed of a material selected from the group consisting of Au, Ag, Cu, Ni, and an alloy thereof.

11. A capacitor comprising a ceramic body, respective glass layers formed on opposite surfaces of the ceramic body, and respective first metallic layers formed on the glass layers; wherein the ceramic body is for producing a non-linear capacitor, the first metallic layers are formed of a material which exhibits a bonding force to oxygen which is stronger than the bonding force of Sn to oxygen, and a lead terminal is connected to at least one of the first metallic layers by use of solder containing Pb in an amount of 2.5 wt. % or less.

12. A capacitor comprising a ceramic body, respective glass layers formed on opposite surfaces of the ceramic body, and respective first metallic layers formed on the glass layers; wherein the ceramic body is of a type which will produce a non-linear capacitor, the first metallic layers are formed of a material which exhibits a bonding force to oxygen stronger than the bonding force of Sn to oxygen, a respective second metallic layer formed of a material selected from the group consisting of Au, Ag, Cu, Ni, and an alloy thereof is formed on each said first metallic layer, and a lead terminal is connected to at least one of the second metallic layers by use of solder containing Pb in an amount of 2.5 wt. % or less.

13. A capacitor according to claim 11 or 12, wherein the material which exhibits a bonding force to oxygen which is stronger than the bonding force of Sn to oxygen is selected from the group consisting of Ti, Mo, W, V, Cr, Ni, and an alloy thereof.

14. A capacitor according to claim 13 wherein at least one of the first and second metallic layers is formed through vacuum deposition or sputtering.

15. A capacitor according to claim 14, wherein each said glass layer has a thickness of 0.01–0.1 µm.

16. A capacitor comprising a ceramic body, respective glass layers formed on opposite surfaces of the ceramic body, and respective first metallic layers formed on the glass layers; wherein the ceramic body is of the type which will produce a non-linear capacitor, the first metallic layers are formed of a material which exhibits a bonding force to oxygen which is stronger than the bonding force of Sn to oxygen, and a lead terminal which is plated with a substance containing Pb in an amount of 5 wt. % or less is soldered onto at least one of the first metallic layers.

17. A capacitor comprising a ceramic body, respective glass layers formed on opposite surfaces of the ceramic body, and respective first metallic layers formed on the glass layers; wherein the ceramic body is of a type which will produce a non-linear capacitor, the first metallic layers are formed of a material which exhibits a bonding force to oxygen which is stronger than the bonding force of Sn to oxygen, a respective second metallic layer formed of a material selected from the group consisting of Au, Ag, Cu, Ni, and an alloy thereof is formed on each said first metallic layer, and a lead terminal which is plated with a substance containing Pb in an amount of 5 wt. % or less is soldered onto at least one of the second metallic layers.

18. A capacitor according to any one of claims 1–6, 11, 12 and 16–17, wherein each said glass layer has a thickness of 0.01–0.1 µm.

* * * * *